Oct. 31, 1967 — B. BARRON — 3,350,620
VOLTAGE CONVERTER CIRCUITS WITH SHIFTABLE TAP ON PRIMARY WINDING
Filed Jan. 2, 1964 — 2 Sheets-Sheet 1

INVENTOR.
BENJAMIN BARRON

INVENTOR.
BENJAMIN BARRON

United States Patent Office 3,350,620
Patented Oct. 31, 1967

3,350,620
VOLTAGE CONVERTER CIRCUITS WITH SHIFT-ABLE TAP ON PRIMARY WINDING
Benjamin Barron, Malba, N.Y., assignor to Lear Siegler, Inc., Long Island City, N.Y., a corporation of Delaware
Filed Jan. 2, 1964, Ser. No. 335,010
11 Claims. (Cl. 321—2)

This invention relates to voltage converter circuits and more particularly to circuits for converting direct current voltage from a single source into alternating and/or direct current voltages of different amplitudes.

Many applications exist where it is desired to convert a direct current (DC) voltage of a given amplitude from a primary source into direct current and/or alternating current (AC) voltages having one or more selected amplitudes. One such application is found in installations having one or more pieces of electronic equipment which require AC and/or DC voltages of one or more amplitudes which are the same or different from both the type and amplitude of the voltage available from the installation's power supply source. In an application of this type the ideal situation is to provide the installation with only a single power supply or source and to derive from this single power supply the various types (AC or DC) and amplitudes of the voltages needed.

The present invention is directed to converter circuits operating from a DC voltage source of a single amplitude which are capable of producing AC and/or DC voltages of one or more desired amplitude levels. In accordance with the invention the DC source voltage is converted by switching and transformer action into an AC voltage or predetermined waveform which is induced into one or more secondary windings of a transformer. The voltage waveform induced into each secondary winding, and therefore the average induced voltage, is controlled by electrically changing a tap on the primary of the transformer at a selected time during the conversion cycle. Change of the tap is accomplished at any desired time without the use of any moving parts. In one embodiment of the invention shifting of the tap is performed by magnetic amplifiers whose conduction time is controlled in a desired manner while in another embodiment by silicon controlled rectifiers. The average voltage available from the transformer primary at each secondary is a function of the time of shifting the tap and also the turns ratio of each secondary to the primary. By properly selecting the tap shifting time and the turns ratio and by suitably filtering or rectifying the voltages induced into the various secondaries, each secondary is capable of producing either an AC voltage of substantially sinusoidal waveform or a DC voltage, both of which may be of any desired amplitude level. Thus multilevel AC and/or DC voltages are readily produced from a single source of DC voltage.

It is, therefore an object of the present invention to provide circuits for converting DC voltage from a primary source into multilevel AC and/or DC voltages.

A further object of the invention is to provide circuits for converting DC voltage from a single source into multilevel AC and/or DC voltages by the use of a transformer having a primary winding with an electrically shiftable tap.

Another object of the invention is to provide circuits for converting DC voltage into multilevel AC and/or DC voltages by electrically shifting the position of a tap on the primary winding of a transformer at a controlled time during the conversion cycle to vary the average value of the voltage induced into the transformer secondary windings.

Still a further object of the invention is to provide a power converter circuit operating from a DC source and capable of producing multilevel AC and/or DC voltages by using a shiftable transformer tap in which the shifting of the tap is accomplished by magnetic amplifiers whose bias current is controlled to select the time of shifting.

A further object of the invention is to provide a power converter operating from a DC source using a shiftable transformer tap to control the average value of the transformer secondary voltage in which the shifting of the tap is accomplished by silicon control rectifiers which are under the control of magnetic amplifiers to select the time of shifting.

Other objects and advantages of the present invention will become more apparent upon reference to the following specification and annexed drawings in which.

Figure 1:
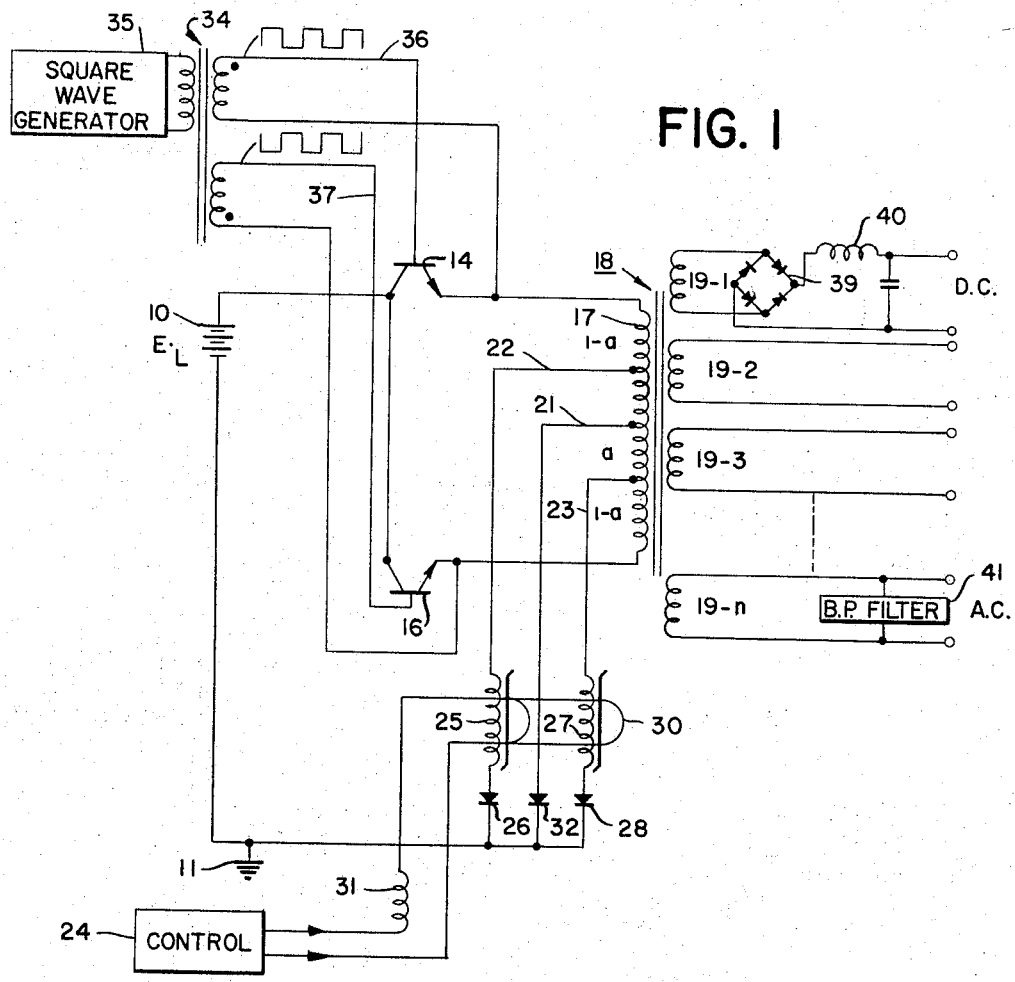
FIGURE 1 is a schematic diagram of a circuit illustrating the operating principles of the present invention.

FIGURE 1 shows one embodiment of the invention using magnetic amplifiers as the elements for controlling the timing of the power conversion cycle. Here, a source of DC voltage having an available voltage $E_1$ is illustrated as a battery 10. It should be understood that any other suitable source of DC current or power supply may be utilized. The negative terminal of battery 10 is connected to a point of reference potential 11, such as ground, while the positive terminal is connected to the collector electrodes of two transistors 14 and 16. These transistors are illustratively shown as NPN types although PNP types can be used if the polarities of the battery and other components are reversed in a manner known to those skilled in the art. The transistors 14 and 16 are selected to have power ratings which are sufficient to handle the maximum power to be converted.

The emitters of transistors 14 and 16 are respectively connected to the upper and lower ends of the primary winding 17 of a transformer 18 which has a number of secondary windings 19–1, 19–2, 19–3, . . . 19–$n$ inductively coupled thereto. As many secondary windings 19 can be provided as is desired with any desired turns ratio as compared to the turns of the primary 17.

The primary winding 17 is center tapped by a lead 21 to provide respectively equal upper and lower winding halves. The upper and lower halves of winding 17 are also tapped at a respective selected point by the lines 22 and 23. The portion of primary winding 17 between its upper end and the tap to which line 22 is connected is designated "1–a" while the portion of the primary winding between the tap created by line 22 and the center tap line 21 is designated "a." Similar designations are used for the lower half of the primary winding between line 23 and its lower end and between the center tap winding 21 and line 23. It should be understood that both halves of winding 17 are approximately symmetrical.

Connected to line 22 is a magnetic amplifier 25 of conventional construction. A diode 26 is connected between the magnetic amplifier 25 and ground 11. Diode 26 is poled to pass positive going voltage to the point of reference potential when the magnetic amplifier 25 is in a conducting state. A similar magnetic amplifier 27 and diode 28 are connected between line 23 and the point of reference potential 11. Both magnetic amplifiers 25 and 27 are linked by a common control winding 30 which receives control current from a suitable control device 24 to simultaneously control the conductive states of the two magnetic amplifiers. Device 24 has a variable time control for producing output control current at a predetermined time to fire the amplifiers 25 and 27. It can be, for example, a thyratron, silicon controlled rectifier, or any other suitable device whose conduction time can be readily controlled. An inductor 31 is used in the control winding 30 to provide AC isolation. Another positively poled diode 32 is connected between the center tap 21 and ground 11 and is also poled to pass positive going voltage.

Operation of the circuit is governed by a square wave generator 35 which produces transformer action by cyclically switching transistors 14 and 16 on and off. Generator 35 supplies a square wave voltage output to the primary of an isolation driver transformer 34 having two secondary windings. The same polarity voltage appears on the dotted end of each secondary winding at the same time, in accordance with conventional notation. The upper (dotted) end of the upper secondary winding and the lower (undotted) end of the lower secondary winding of transformer 34 are respectively connected to the base electrodes of transistors 14 and 16 by lines 36 and 37. This places voltages 180° out of phase on the two base electrodes at the same time. The other end of each secondary winding is connected to the emitter electrode of the same transistor. Thus, transistor 14 is fully conductive when transistor 16 is cut-off, and vice versa, in accordance with the production of square waves by generator 35.

The square wave generator 35 is of any suitable conventional construction and, for example, may be a free-running multivibrator, a bistable multivibrator whose frequency is controlled by triggering pulses from a suitable clock generator (not shown) or from a highly stable oscillator, or any other suitable type of fixed or variable frequency oscillator circuit with limiter, clipper, or other means for producing the square wave output pulses.

The signals on the two lines 36 and 37 respectively control the conducting state of the two transistors 14 and 16. During one-half of the generator 35 output cycle, transistor 14 conducts in response to a positive going signal on line 36 at its base electrode. At the same time, the base electrode of transistor 16 is receiving a negative signal on line 37 so it is cut off. During the next half of the cycle, the states of the two transistors are reversed. This results in producing alternate and cyclically occurring positive and negative square wave voltage pulses at the upper and lower ends of the primary winding 17.

To describe the first state of operation of the circuit, consider that the signal on line 36 is positive so that transistor 14 is conducting and transistor 16 is cut off. Also consider that the control current in winding 30 is of such a magnitude that magnetic amplifiers 25 and 27 are substantially nonconducting, meaning that they will not pass current to diodes 26 and 28. In this case current will flow through the transistor 14, both portions "$1-a$" and "$a$" of the upper half of the primary winding 17, and through diode 32 to ground. If the voltage from battery 10 is $E_i$, then the instantaneous voltage ($e_o$) induced into a secondary winding 19 by the upper half of primary winding 17 during this portion of the half cycle, assuming a turns ratio of one, will be:

(1) $\quad e_o = E_i (1-a+a) = E_i$

Now, at a second time designated by a phase angle $\theta$, during the half-cycle under consideration, due to the control current applied to winding 30, if the magnetic amplifier cores are made to conduct, a current path is provided through line 22, magnetic amplifier 25 and diode 26 to ground 11. At this time line 22 is an intermediate tap on the primary 17 so that a voltage of opposite polarity (negative) is produced on line 21. This back biases diode 32 and opens the path to ground for line 21. At this time $\theta$, the instantaneous voltage induced into a secondary 19 by the upper half of primary winding 17 between line 22 and its upper end, still assuming a unity turns ratio, will increase to:

(2) $\quad e_{o2} = \dfrac{1}{1-a} E_i$

The voltage $e_{o2}$ is greater than the voltage $e_{o1}$, as can readily be seen, because the turns ratio of the secondary to primary windings is effectively increased by decreasing the number of available turns in the primary to produce $e_{o2}$. Thus, the resultant voltage induced by transformer action into each secondary goes from a first level $e_{o1}$ to a higher level $e_{o2}$ at the time of firing magnetic amplifier 25.

When the generator 35 switches the conducting states of transistors 14 and 16, the same voltage generation described above by Equations 1 and 2 will be produced by the lower half of the transformer primary winding. Now, however, the polarity of the output voltage on each secondary winding 19 will be reversed. In this half-cycle, transistor 16 is used, and magnetic amplifier 27 is fired at time $\theta$. Thus, positive and negative half-cycles of two level AC voltage of square waveform shape are produced in the transformer secondaries 19. It should be understood that instantaneous induced voltages $e_o$, given by Equations 1 and 2, of any desired amplitude can be selected for any secondary winding 19 by suitable choice of $E_i$ and the turns ratio.

By varying the control current in winding 30, the phase angle $\theta$ of firing of the magnetic amplifiers 25 and 27 can be controlled. This, in turn, varies the average of the voltage across each of the secondaries 19 available for filtering to produce a sinusoidal type AC voltage or for rectification to produce a DC voltage. If desired, the voltage at a secondary 19 can be used without filtering or rectification in proper applications. Multilevel AC and/or DC voltages can be obtained by choice of different turns ratio for each secondary winding 19.

Figure 2:
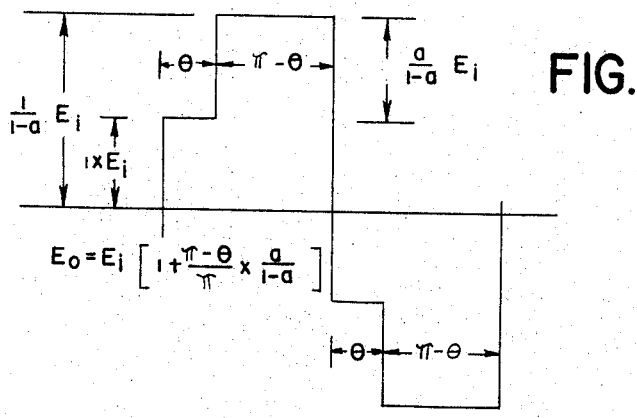
FIGURE 2 is a representation of the output wave-forms produced by the converter circuits of the present invention.

FIGURE 2 illustrates the output voltage available at a secondary winding 19 where the primary-secondary turns ratio is unity. As can be seen from Equation 1, with the magnetic amplifiers 25 and 27 nonconducting, and a full half of the primary winding available, a minimum instantaneous output voltage of:

(3) $\quad e_{o\,min} = E_i$ is obtained. With the magnetic amplifiers conducting, a maximum instantaneous output voltage, given by Equation 2, of:

(4) $\quad e_{o\,max} = \dfrac{1}{1-a} E_i$ is obtained.

A transformer ratio $r$, defined as the difference between the maximum voltage available with the magnetic amplifiers conducting and nonconducting is obtained by subtracting 3 from 4 and is given as:

(5) $\quad r = \dfrac{a}{1-a}$

The value (6) $\quad s = rE_i = \dfrac{a}{1-a} E_i$ is the actual voltage shift between the two voltage levels.

The general expression for the average output voltage $E_o$ across the secondary is obtained by integrating the area under the curve, which is formed by two rectangular wave forms. This expression for a positive or half-cycle, with suitable algebraic sign applied is:

(7) $\quad E_o = E_i \left[ 1 + \dfrac{\pi - \theta}{\pi} \cdot \dfrac{a}{1-a} \right]$ At a firing angle of $\theta$ equal zero, we see from 7 that:

(8) $\quad E_{o\,max} = \dfrac{1}{1-a} E_i$ which is the maximum average output voltage available during a half-cycle. From 7 we also see that when $\theta = \pi$, then:

(9) $\quad E_{o\,min} = E_i$ which is the minimum average output voltage available.

Thus it should be clear that variation of $\theta$ by the magnetic amplifiers 25 and 27 controls the value of $E_o$.

As shown in FIGURE 1, secondary circuit 19–1 illustratively has a full wave rectifier 39 and a choke input filter 40 to produce a rectified DC output voltage. Circuit 19–n has a bandpass filter 41 connected thereacross to filter out the fundamental of the wave induced into the secondary winding to produce a substantially sinusoidal AC voltage output. The other secondaries can have similar circuits for producing the AC and DC voltages as desired. The magnitude of each of these voltages is determined by the turns ratio of the secondary to the primary for a respective circuit.

Figure 3:
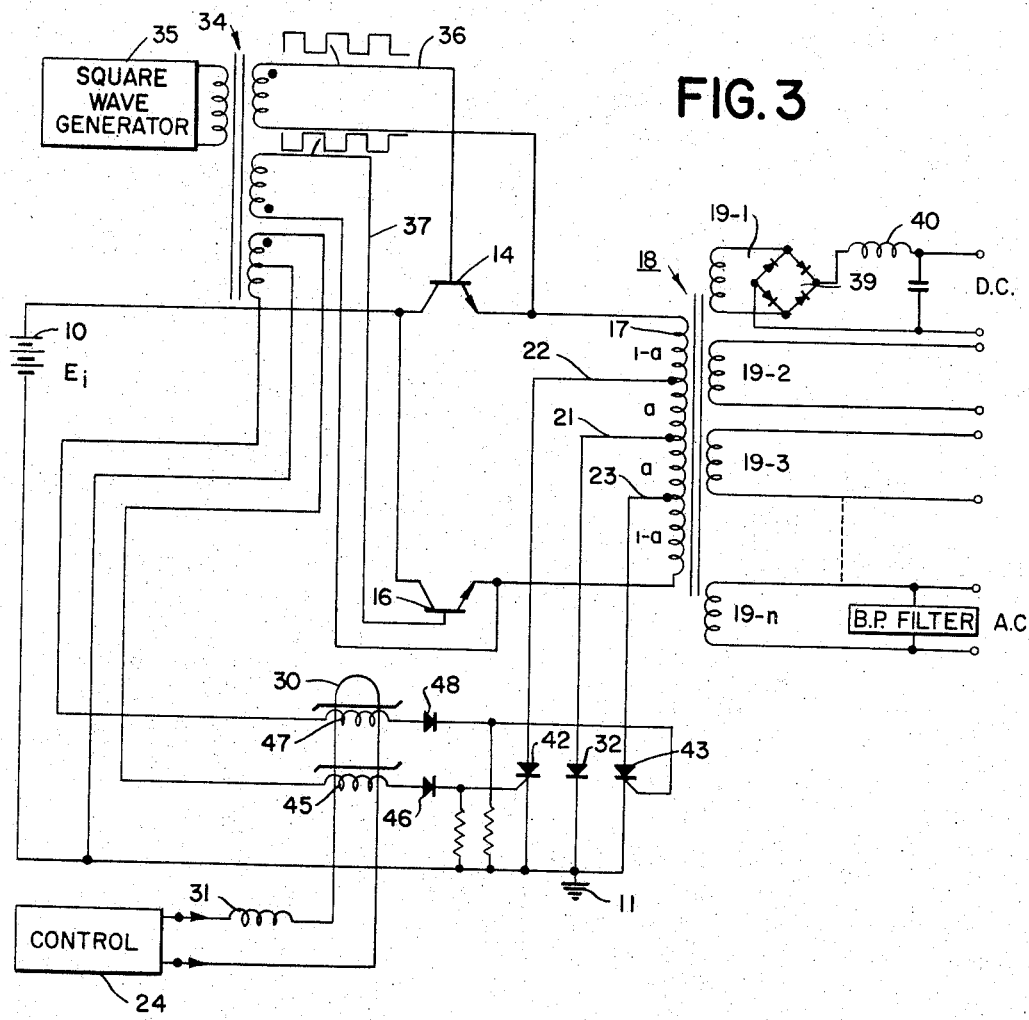
FIGURE 3 is a schematic diagram of another circuit embodiment illustrating the operating principles of the present invention.

FIGURE 3 shows another circuit for controlling larger amounts of power. The same reference numerals have been used as in FIGURE 1, where applicable. The magnetic amplifiers 25 and 27 of FIGURE 1 have been replaced in lines 22 and 23 by silicon control rectifiers 42 and 43. Both rectifiers 42 and 43 are poled to pass positive going voltage to the point of reference potential 11 when they are rendered conductive, or fired, by applying a suitable voltage to their gating electrodes.

The gating electrodes of diodes 42 and 43 are connected to respective magnetic amplifiers 45 and 47 through diodes 46 and 48. Magnetic amplifiers 45 and 47 have smaller signal handling capacity than magnetic amplifiers 25 and 27 of FIGURE 1, since the former are only used as control amplifiers to fire the silicon rectifiers rather than to handle the current in the transformer primary directly. Magnetic amplifiers 45 and 47 are linked by the common control winding 30 to provide control current and thus control the firing angle $\theta$. Each of the amplifiers 45 and 47 can be gated into conduction only during the half-cycle during which its respectively connected rectifier 42 or 43 is to be operated. This is insured by applying signals from a third secondary transformer 34 to the respective amplifiers 45 and 47 of the same polarity as those applied to the base of the transistor connected to the half of the transformer primary to which the respective rectifiers 42 and 43 are connected. An amplifier 45 or 47 will not conduct to fire its connected rectifier 42 or 43 unless that amplifier receives both a gating signal from generator 35 through transformer 34 and a sufficient amount of control current from winding 30.

The operation of the circuit of FIGURE 3 is similar to that of FIGURE 1 except that the silicon control rectifiers 42 and 43 handle the current under the direction of magnetic amplifiers 45 and 47.

To explain the operation of the circuit of FIGURE 3, consider that a positive going signal is applied from generator 35 to the base of transistor 14. Magnetic amplifier 45 is gated by this positive going signal so that it can be rendered conductive during this half-cycle at a time determined by the control current in winding 30. At a time prior to the conduction of amplifier 45, current flows from transistor 14 through the entire upper half of primary winding 17, over line 21 and to ground 11 through the signal diode 32. When magnetic amplifier 45 is rendered conductive by the control current in winding 30, silicon control rectifier 42 is fired and a current path is provided from the upper end of winding 17, through portion 1–a, line 22, and through control rectifier 42 to ground. At this time line 21 receives a negative voltage which back biases diode 32 and prevents it from conducting.

The action of the circuit on the negative half of the cycle is the same, so that when transistor 16 is conducting, magnetic amplifier 47 is gated for operation at a firing angle $\theta$ determined by the control current in winding 30 to render silicon control rectifier 43 conductive. Thus, alternate positive and negative half-cycles of voltage are induced in the transformer secondary windings 19. The magnitude of the $e_o$ and $E_o$ voltages are as given in Equations 1 to 9 above.

In the circuit of FIGURE 3 no losses occur in the silicon rectifiers 42 and 43 during the half-cycles when they are supposed to be nonconducting since these rectifiers are commutated simultaneously with the switching action of the transistors 14 and 16. This is accomplished in the same manner as blocking of the rectifier 32 since as the power transistors switch, a reverse (blocking) bias voltage is applied to the silicon control rectifier in the half of the primary winding which is not receiving current from its respectively connected transistor at that time.

The converter circuits of the present invention can be stabilized to produce a predetermined $E_o$ by varying the firing angle $\theta$ through the control winding 30 current. This can readily be accomplished by rectifying the output voltage of a secondary winding, comparing the rectified output voltage to a standard voltage, such as by a voltage sensing bridge or zener diode, and using the resultant of the comparison to vary the control current, i.e., the time $\theta$ at which it will fire the magnetic amplifiers. Circuits for accomplishing this are conventional in the art. Thus, stabilized multilevel AC and/or DC voltages can be produced from the single DC source by using one of the output voltages to control the firing time $\theta$ thereby controlling the outputs of all of the circuits 19.

To explain how the value of "$a$" for one-half of the transformer primary 17 is determined, the following quantitative example is given. Assume that $E_i = 25$ volts and that it is desired to shift from 25 ($e_{o\ min}$) to 30 ($e_{o\ max}$) volts in a secondary winding having unity turns ratio, at time $\theta$. From 1 and 2 we have:

(1) $$e_{o\ min} = E_i$$

and (2) $$e_{o\ max} = \frac{1}{1-a} E_i$$

Substracting 1 from 2 gives:

(10) $$30 = \frac{1}{1-a} \cdot 25 \text{ or } a = \frac{30-25}{30} = .187$$

In general:

(11) $$a = \frac{e_{o\ max} - e_{o\ min}}{e_{o\ max}}$$

It can be shown that the variation of the output waveform of the secondary windings 19 is such that the ratio of the fundamental (sine wave) harmonic of the output waveform to the average DC voltage is defined by the expression:

(12) $$T = \frac{\sqrt{1-a+a^2/2+(a-a^2/2)\cos\theta}}{1-\frac{a\theta}{\pi}}$$

As "$a$" decreases in 12 it can be seen that the sine wave fundamental will closely track the average DC voltage. Thus, the converters of the present invention can be used to regulate average DC output ($E_o$) and produce an AC output at the same time, as in FIGURES 1 and 3. This can be accomplished over a relatively wide variation of DC power input from source 10.

It can therefore be seen that apparatus has been provided which is readily capable of converting DC voltage to controlled multilevel AC and/or DC voltages by electrically shifting a tap on a transformer without the use of any moving parts. The circuits of the present invention have relatively little losses other than diode type forward voltage drop losses and transformer losses. These factors represent only a small fraction of the total power capable of being handled. The circuits of the invention also achieve good voltage regulation because the transformer output windings always present a low driving impedance for the loads. Further, the current drawn from the primary voltage source has a smoother form factor since the level of this current never falls to a sustained zero value. This reduces adverse coupling effects on other loads connected to the same primary DC source.

As an additional advantage, the form factor occurring in the transformer windings is maintained near the ideal value, thereby reducing losses due to heating. Since the output waveform is substantially a square wave, the filtering for DC loads is reduced from that normally required by sine wave output voltages. If AC loads are connected to the transformer outputs, then the fundamental values of these loads track the DC voltage values closely, thereby further increasing the usefulness of the device for multilevel power control.

While preferred embodiments of the invention have been described above, it will be understood that these embodiments are illustrative only and the invention is to be limited solely by the appended claims.

What is claimed is:

1. A circuit for converting direct current voltage from a source comprising:
   a transformer having a primary and at least one secondary winding,
   switching means electrically connected between said source and said transformer primary winding for converting said direct current voltage from said source into an alternating current voltage for application to said primary winding, the alternating current voltage at said primary being induced into a said secondary,
   first unidirectional current conducting means connected to a first selected point on said primary winding and to a point of reference potential, said first unidirectional current conducting means normally being rendered conductive in response to said alternating current voltage produced by said switching means,
   second unidirectional current conducting means connected to a second selected point on said transformer primary winding different from said first point and to a point of reference potential,
   and means connected to said second unidirectional current conducting means for rendering the same conductive at a selected time during the alternating current voltage cycle produced by said switching means, the conduction of said second unidirectional current conducing means producing a voltage at said first selected point to render said first unidirectional current conducting means non-conductive.

2. A circuit as forth in claim 1 and further comprising at least two secondary windings, means connected to one of said secondary windings for rectifying the alternating current voltage induced therein to produce a direct current output voltage, and means connected to the other of said secondary windings for producing a substantially sinusoidal voltage output in response to the voltage induced therein.

3. A circuit for producing multilevel alternating current voltage from a source of direct current voltage comprising:
   a transformer having a primary and at least one secondary winding,
   switching means electrically connected between said source and said transformer primary winding for converting said direct current voltage from said source into an alternating current voltage for application to said primary winding, the alternating current voltage at said primary being induced into a said secondary,
   first unidirectional current conducting means connected to a first selected point on said primary winding and to a point of reference potential, said first unidirectional current conducting means normally being rendered conductive in response to said alternating current voltage,
   magnetic amplifier means connected to a second selected point on said transformer primary winding different from said first point and to a point of reference potential,
   and means connected to said magnetic amplifier means to render the same conductive at a selected time during the alternating current voltage cycle, the conduction of said magnetic amplifier means producing a voltage at said first selected point to render said first unidirectional current conducting means non-conductive.

4. A circuit for converting direct current voltage from a source comprising:
   a transformer having a primary and at least one secondary winding,
   switching means electrically connected between said source and said transformer primary winding for converting said direct current voltage from said source into an alternating current voltage for application to said primary winding, the alternating current voltage at said primary being induced into a said secondary,
   first unidirectional current conducting means connected to a first selected point on said primary winding and to a point of reference potential, said first unidirectional current conducting means normally being rendered conductive in response to said alternating current voltage,
   a controlled rectifier means connected to a second selected point on said transformer primary winding different from said first point and to a point of reference potential,
   and means connected to said controlled rectifier means to render the same conductive at a selected time during the alternating current voltage cycle produced by said switching means, the conduction of said controlled rectifier means producing a voltage at said first selected point to render said first unidirectional current conducting means non-conductive.

5. A circuit for converting direct current voltage from a source comprising:
   a transformer having a primary and at least one secondary winding,
   switching means electrically connected between said source and said transformer primary winding for converting said direct current voltage from said source into an alternating current voltage for application to said primary winding, the alternating current voltage at said primary being induced into a said secondary,
   first unidirectional current conducting means connected to a first selected point on said primary winding and to a point of reference potential, said first unidirectional current conducting means normally being rendered conductive in response to said alternating current voltage,
   a controlled rectifier means connected to a second selected point on said transformer primary winding different from said first point and to a point of reference potential,
   and magnetic amplifier means connected to said controlled rectifier means for producing a signal to render said controlled rectifier means conductive at a selected time during the alternating current voltage cycle produced by said switching means, the conduction of said controlled rectifier means producing a voltage at said first selected point to render said first unidirectional current conducting means non-conductive.

6. A circuit for converting direct current voltage from a source comprising:
   a transformer having a primary and at least one secondary winding,
   switching means electrically connected between said source of direct current voltage and both ends of said transformer primary winding for converting said direct current voltage into an alternating current voltage for application to said primary winding, said alternating current voltage at said primary being induced into a said secondary,
   a first unidirectional current conducting means connected to the electrical mid-point of said primary winding and to a point of reference potential,
   a respective second normally non-conducting unidirectional current conducting means electrically connected to said transformer primary winding at a respective point between said electrical mid-point and each end of said primary winding, each said second unidirectional current conductng means also being electrically connected to said point of reference potential, and means electrically coupled to each of said second unidirectional current conducting means for rendering each of said means conductive at a predetermined time during the alternating current voltage cycle produced by said switching means.

7. A circuit as set forth in claim 10 and further comprising at least two secondary windings, means connected to one of said secondary windings for rectifying the alternating current voltage induced therein to produce a direct current output voltage, and means connected to the other of said secondary windings for producing a substantially sinusoidal voltage output in response to the voltage induced therein.

8. A circuit for converting direct current voltage from a source comprising:
 a transformer having a primary and at least one secondary winding,
 switching means electrically connected between said source of direct current voltage and both ends of said transformer primary winding for converting said direct current voltage into an alternating current voltage for application to said primary winding, said alternating current voltage at said primary being induced into a said secondary winding,
 a first unidirectional current conducting means connected to the electrical mid-point of said primary winding and to a point of reference potential,
 a respective normally non-conductive magnetic amplifier means electrically connected to said transformer primary winding at a respective point thereon between said electrical mid-point and each end of said primary winding, each said magnetic amplifier means also being electrically connected to said point of reference potential,
 a control current winding electrically coupled to each of said magnetic amplifiers,
 and means connected to said control winding for supplying current thereto for rendering each said magnetic amplifier means conductive at a predetermined time during the alternating current voltage cycle produced by said switching means.

9. A circuit for converting direct current voltage from a source comprising:
 a transformer having a primary and at least one secondary winding,
 switching means electrically connected between said source of direct current voltage and both ends of said transformer primary winding for converting said direct current voltage into an alternating current voltage for application to said primary winding, said alternating current voltage at said primary being induced into a said secondary winding,
 a first unidirectional current conducting means connected to the electrical mid-point of said primary winding and to a point of reference potential,
 a respective normally non-conductive controlled rectifier means electrically connected to said transformer primary winding at a respective point thereon between said electrical mid-point and each end of said primary winding, each said controlled rectifier means also being electrically connected to said point of reference potential,
 and means connected to each said controlled rectifier means for rendering each said means conductive at a predetermined time during the alternating current voltage cycle produced by said switching means.

10. A circuit for converting direct current voltage from a source comprising:
 a transformer having a primary and at least one secondary winding,
 switching means electrically connected between said source of direct current voltage and both ends of said transformer primary winding for converting said direct current voltage into an alternating current voltage for application to said primary winding, said alternating current voltage at said primary being induced into a said secondary winding,
 a first unidirectional current conducting means connected to the electrical mid-point of said primary winding and to a point of reference potential,
 a respective normally non-conductive controlled rectifier means electrically connected to said transformer primary winding at a respective point thereon between said electrical mid-point and each end of said primary winding, each said controlled rectifier means also being electrically connected to said point of reference potential,
 and a respective magnetic amplifier means connected to each said controlled rectifier means for rendering said rectifier means conductive at a predetermined time during the alternating current voltage cycle produced by said switching means.

11. A voltage conversion circuit operating from a source of alternating current voltage comprising:
 a transformer having a primary winding receiving said alternating current voltage and at least one secondary winding electromagnetically coupled thereto,
 first, second and third unidirectional current conducting means electrically connected respectively to first, second and third points on said primary winding, said first point being the center tap of the primary winding and said second and third points being intermediate said first point and a respective end of said primary winding, said first unidirectional current conducting means normally being conductive in response to said alternating current voltage to establish a first turns ratio between the transformer primary and secondary windings, with the portion of the primary from one end thereof to the center tap being operative,
 and means electrically connected to said second and third unidirectional current conducting means for rendering the same conductive at a predetermined time during each half cycle of an alternating voltage current cycle, the conduction of said second and third unidirectional current conducting means producing a voltage at said first point to render said first unidirectional current conducting means non-conductive thereby establishing a second turns ratio between the transformer primary and secondary windings with the portion of the primary from an end to one of said second and third points being operative.

References Cited
UNITED STATES PATENTS

| | | | |
|---|---|---|---|
| 2,239,437 | 4/1944 | Bedford. | |
| 2,543,232 | 2/1951 | Dillon | 321—2 X |
| 3,085,190 | 4/1963 | Kearns et al. | 321—45 |
| 3,176,212 | 3/1965 | DePuy | 321—18 X |
| 3,196,337 | 7/1965 | Elliott et al. | 321—45 |
| 3,210,638 | 10/1965 | Walker | 321—18 |
| 3,217,239 | 11/1965 | Lunney | 323—43.5 |
| 2,959,726 | 11/1960 | Jensen | 323—43.5 X |

JOHN F. COUCH, *Primary Examiner.*

W. H. BEHA, *Assistant Examiner.*